United States Patent [19]

Cohn

[11] Patent Number: 5,254,997
[45] Date of Patent: Oct. 19, 1993

[54] RETRODIRECTIVE INTERROGATION RESPONSIVE SYSTEM

[75] Inventor: Marvin Cohn, Baltimore, Md.

[73] Assignee: Westinghouse Electric Corp., Pittsburgh, Pa.

[21] Appl. No.: 923,288

[22] Filed: Jul. 31, 1992

[51] Int. Cl.$^5$ ............................................. G01S 13/80
[52] U.S. Cl. ........................................ 342/44; 342/51
[58] Field of Search ............................ 342/44, 42, 51

[56] References Cited

U.S. PATENT DOCUMENTS

| | | | |
|---|---|---|---|
| 3,715,749 | 2/1973 | Archer | 342/157 |
| 3,731,313 | 5/1973 | Nagai | 343/893 X |
| 3,754,257 | 8/1973 | Coleman | 342/370 |
| 3,757,335 | 9/1973 | Gruenberg | 342/367 |
| 3,898,663 | 8/1975 | Albert | 342/187 |
| 3,914,762 | 10/1975 | Klensch | 342/44 |
| 3,938,151 | 2/1976 | Trenam | 343/795 X |
| 3,958,246 | 5/1976 | Wohlers et al. | 342/6 X |
| 4,031,535 | 6/1977 | Isbister | 342/46 |
| 4,210,910 | 7/1980 | Wohlers | 342/60 |
| 4,347,512 | 8/1982 | Sweeney | 342/6 |
| 4,806,938 | 2/1989 | Meadows | 342/370 |
| 4,985,707 | 1/1991 | Schmidt et al. | 342/370 |
| 5,064,140 | 11/1991 | Pittman et al. | 244/3.13 |

Primary Examiner—John B. Sotomayor
Attorney, Agent, or Firm—N. A. Nixon

[57] ABSTRACT

A retrodirective interrogation responsive system wherein a responder, illuminated by an interrogator, receives an interrogation signal, modulates information onto the interrogation signal, and retransmits the encoded interrogation signal back in the direction of arrival of the collected interrogation signal. The responder uses a Van Atta array antenna and is capable of responding to an interrogator signal incident over a wide solid angle of arrival while retrodirectively retransmitting without amplification substantially all of the collected signal within a narrow solid angle. The responder may be implemented using monolithic microwave integrated circuit technology (MMIC), thus being suitable for high volume production.

23 Claims, 3 Drawing Sheets $\phi_A$ = TAG ACCEPTANCE BEAMWIDTH
$\phi_R$ = TAG RESPONSE BEAMWIDTH
$\phi_A \gg \phi_R$ (i,j) ELEMENT CONNECTED TO (N−i+1, M−j+1)
VAN ATTA RETRODIRECTIVE ARRAY

RETRODIRECTIVE INTERROGATION RESPONSIVE SYSTEM

BACKGROUND OF THE INVENTION

This invention relates to a system for remote detection, location, identification and monitoring of physical objects including persons and vehicles. This system includes a responder, such as a remote tag device, and an interrogator. This device is capable of accepting a signal, uniquely encoding the signal and retransmitting the encoded signal back to an interrogator.

Prior art interrogator-responder systems have employed a variety of methods to return the desired response to the interrogator. One method allowing unique responder identification by the interrogator uses matched transmitter-receiver sets, with each set tuned to a different frequency. Because the number of transmitter-receiver pairs increases with each object or person to be monitored, large scale systems of this type are complex, unwieldy and expensive.

Other systems use responders that broadcast unique identification signals for acquisition and recognition by the interrogator. However, prior art does not impose the desired responder information upon a retransmitted interrogator signal. Instead, the responder internally generates and transmits a signal with the proper characteristics. Time reference and synchronization means may be needed to create a desired identification code and to effect code transmission sequencing. Accordingly, such systems possess substantial power requirements.

Responders powered by the collected interrogator signal, as found in magnetic or inductive coupling systems, require close proximity or precise alignment between the responder and the interrogator for proper operation.

Responders typically transmit a broad, non-directional beacon signal and not a narrow, retrodirective beam. Generally, a non-directional beam demands more power to transmit a signal to the interrogator than does a highly directional beam at equivalent distances. Therefore, a low-power, non-directional broadcast from a responder is generally unsuitable for certain applications, e.g., in noisy environments or where large distances exist between interrogator an responder.

To form a coherent, retrodirective wavefront, prior art Van Atta arrays require adjusting the length and characteristic impedance of each transmission line which interconnect the paired antenna elements. Nagai, U.S. Pat. No. 3,731,313, teaches a linear Van Atta array which achieves retrodirectivity by inserting impedance matching stubs into the interconnecting transmission lines. Although the impedance matching stubs eliminate the need for adjusting the interconnecting transmission line length, stub length requires adjustment to achieve retrodirectivity.

Trenam, U.S. Pat. No. 3,938,151, teaches a Van Atta array of printed circuit radiators that does not require adjustable transmission lines or impedance matching stubs to achieve retrodirectivity. This array does not, however, modulate or transform the incident wavefront prior to reflection towards the direction of the source. In addition, Trenam's art consists of large, discrete components intended to cover the surface of a large decoy balloon.

Pittman, et al., U.S. Pat. No. 5,064,140, teach a two-dimensional Van Atta array which imposes an information-carrying modulation upon the collected wavefront before retrodirective transmission to the original source. This art also teaches amplification of the signal before retrodirective transmission.

Small, low-power, inexpensive responder devices are useful for applications such as vehicle tracking, runway and road marking, personnel identification, remote process monitoring and meter reading.

It is important for such devices to have the following capabilities:

(1) Respond to an interrogator only when illuminated by that interrogator;

(2) Respond to interrogations arriving from any direction within a large solid angle so that the orientation of the device is not critical;

(3) Confine the device's response to the interrogator to a small solid angle centered about the location of the interrogator;

(4) Operate through adverse weather conditions (rain, fog, etc.); and (5) Provide a unique response which would permit the interrogator to distinguish the tag device from surrounding clutter return and other tag devices.

Short wavelength (e.g., microwave or millimeter wavelengths) operations are desirable because the directive interrogation can be achieved with an interrogator antenna of convenient size, and the narrow retrodirective beam can be formed by a physically small device. Because the retrodirective beam is concentrated within a narrow solid angle, interrogator power requirements are reduced.

Small device size facilitates the use of monolithic semiconductor materials which decreases the cost of production while increasing the reliability of the devices.

The prior art devices are not suitable for small, inexpensive and low-power applications or high-volume fabrication and production with the above capabilities. The device described herein differs from prior solutions in the following ways:

(1) The responder device or tag requires no radio-frequency sources or amplifiers, because the incoming interrogation signal is modulated by a low frequency source at the device before being transmitted back to the interrogator.

(2) Less radio-frequency interrogator power is required because the interrogator beam can be very directive and the evoked response is concentrated in a narrow beam in the direction of the interrogator.

(3) The device can be produced in large quantities using monolithic technology.

SUMMARY OF THE INVENTION

The invention provides for a retrodirective interrogation responsive system for remote monitoring that includes an interrogator having a transmitter which transmits an interrogation signal to a remote responder unit. The remote responder unit collects the interrogation signal, encodes information into the interrogation signal at the responder, and redirects substantially all of the portion of the interrogation signal collected by the responder back to the direction of the interrogator.

The interrogator then collects the encoded signal from the responder. The interrogator has means for decoding the information which has been placed on the responder signal. The retrodirective means includes a Van Atta array which can be modulated to include the information which is desired to be transmitted to the interrogator.

The responder uses a Van Atta array to redirect substantially all of the collected portion of the interrogator's signal. Therefore, the energy for this redirected signal is obtained directly from the interrogator signal and is retrodirective over a solid angle which includes the interrogator.

The encoded signal may be phase, frequency or amplitude modulated onto the reflected signal in the Van Atta array. Additional embodiments include the ability to turn off the array so that it does not respond to interrogation signals. In the "STOP" mode the interrogation signal is absorbed within the array. In some embodiments, specific circuitry is included within the monolithic structure to provide for modulation of the signal.

DESCRIPTION OF THE PREFERRED EMBODIMENT

Figure 1:
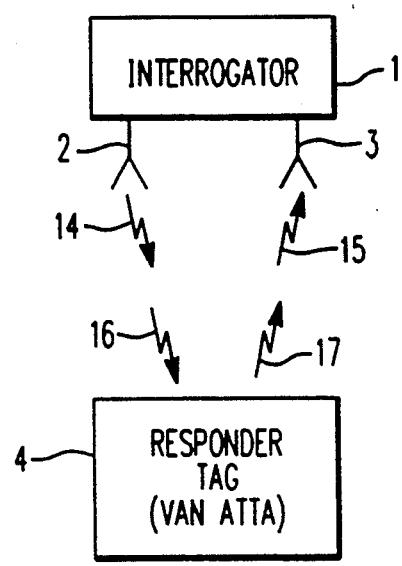
FIG. 1 is a diagrammatic representation of a system having an interrogator and a responder tag.

The invention provides an identification and monitoring system that can be used to locate, identify and monitor personnel and equipment, including vehicles.

The responder device or tag can use a two-dimensional Van Atta array antenna having a plurality of paired antenna elements arranged in diagonal symmetry around the center of the array. Each pair of antenna elements is connected by a transmission line of approximately equal length. Presently preferred embodiments of the device include a low-frequency bilateral modulation mechanism which is interposed in the transmission line between the paired antenna elements.

A Van Atta array consists of radiating elements such as horns, slots, dipoles, etc. which are interconnected in pairs by equal length transmission lines. Diagonal symmetry of the radiating elements around the center of the array should be maintained in a planar Van Atta array antenna in order for the incident signal wavefront to be collected and retransmitted coherently.

An electromagnetic signal incident upon a Van Atta array is collected by the array elements, propagated through the array and retransmitted by the array elements in the direction from which the signal emanated. Without modulation the incident interrogator signal would be reflected unaltered back to the interrogator. If a modulator is placed in each transmission line branch, information can be added to the retrodirective signal and this response can be distinguished from other reflected return signals.

The modulator used in the transmission line may be a bilateral modulator or a unilateral modulator. With a bilateral modulator, the interrogation signal can be collected by one element of the antenna pair, modulated, and retransmitted out of the other antenna pair element, or vice versa. With a unilateral modulator, the interrogation signal can be modulated in only one direction. This property halves the number of effective transmitting antenna elements (n).

Because retrodirective power is proportional to $n^2$, unilateral modulators reduce the reflected power to 25% of that achieved by bilateral modulators. One way to offset this power loss is to add signal amplifiers to each unilateral modulator. Although retransmission power is increased by the amplifiers, the complexity and power consumption of the unilaterally modulated Van Atta array antenna also is increased.

The modulation mechanism of this invention can be used to (1) impose a unique identification code upon the outgoing signal, (2) modulate the signal in either direction of propagation, and (3) absorb the interrogation signal when the information to be modulated onto the retrodirective signal is in the "STOP" condition. In the "STOP" condition, the responder device is in a quiescent state and does not retransmit the interrogation signal back in the direction of the interrogator. No amplification of the modulated interrogation signal is required before retransmission to the interrogator by the Van Atta array.

The responder device described herein implements a Van Atta array antenna structure with monolithic microwave integrated circuit (MMIC) technology thereby realizing a small, low-power, inexpensive, and an inherently reliable retrodirective identification device suitable for high-volume production. Alternately, the array may be fabricated with hybrid microwave integrated circuits and discrete devices, when a larger modulatable Van Atta array antenna is desired or acceptable.

Although the device as described is polarization-sensitive, the device may also be made polarization-insensitive. In addition, the system may be designed such that it can perform over a wide range of operating frequencies.

Other details, objects and advantages of the invention will become apparent as the following description of a present preferred embodiment thereof and a present preferred method of practicing the same proceeds. The accompanying drawings show presently preferred embodiments of the invention and a method of practicing the invention.

In FIG. 1, the interrogator, 1, illuminates a responder device or tag, 4, by radiating electromagnetic energy in the form of an interrogator trnasmitted signal, 14, from transmitting antenna 2. At a responder device, 4, signal 14 is collected as tag received signal, 16. Responder 4 then retransmits substantially all of the collected portion of the interrogator signal as tag transmitted signal, 17. Signal 17 can be encoded with information that is desired to be sent to interrogator 1 such as the identity of responder 4, or other information available to responder 4.

Signal 17 returns to interrogator 1 and is collected by receiving antenna 3 as interrogator received signal, 15. Information regarding responder 4 is extracted through processing of the collected signal 15 by interrogator 1.

Figure 2A:
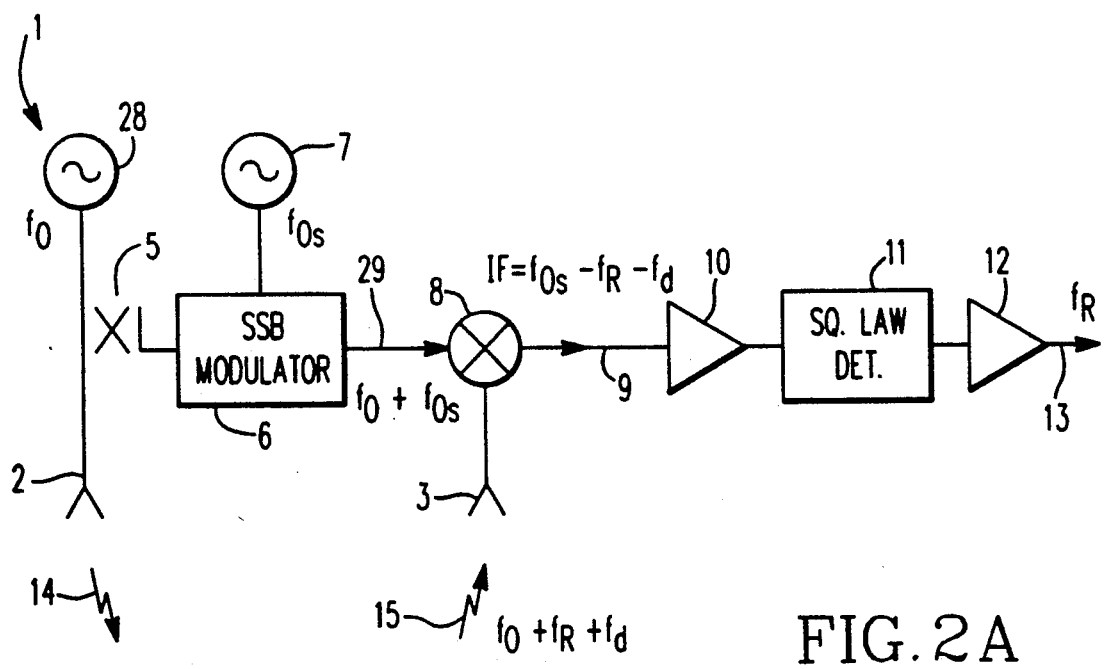
FIG. 2 a,b is a diagrammatic drawing showing details of the interrogator and responder of FIG. 1.

In FIG. 2a interrogator transmitted signal, 14, is generated at frequency $f_0$, within interrogator 1, by radio frequency (RF) oscillator 28. This signal then is propagated to a responder device, 4, through transmitting antenna, 2. The output of RF oscillator 28 is also directed through directional coupler, 5, into single-sideband (SSB) modulator, 6, along with the output of local oscillator, 7. Oscillator 7 operates at frequency $f_{0s}$. Modulator 6 generates offset local oscillator signal ($f_0+f_{0s}$), 29.

Offset local oscillator signal, 29, is input into interrogator receiver mixer, 8, along with interrogator received signal ($f_0+f_R+f_d$), 15, to generate intermediate frequency (IF) ($f_{0s}-f_R-f_d$), 9. Signal $f_d$ represents the Doppler shift due to relative velocity between interrogator 1, and responder 4. Signal $f_R$ represents the modulation frequency of responder 4. IF signal, 9, is amplified by IF signal amplifier 10. IF amplifier 10 output is demodulated by square law detector, 11. This signal then is amplified by modulation signal amplifier, 12, yielding modulation signal ($f_R$), 13, which had been imposed at the responder device. Note that the interrogator transmitter may be separate from the interrogator receiver, but the receiver must be within the response angle of the retrodirective beam.

Figure 2B:
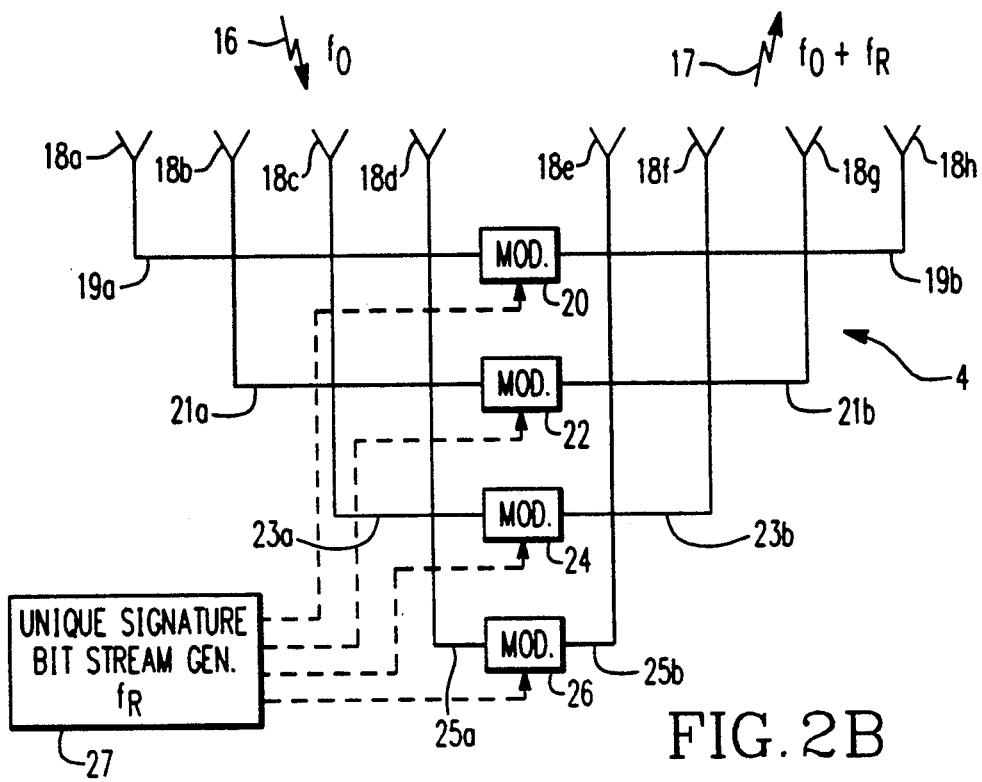

FIG. 2b illustrates a responder device or tag, 4, which uses a linearly-arranged Van Atta array antenna. Tag received signal, 16, is collected by a plurality of paired antenna elements, 18a-h, on responder 4. Each pair of antenna elements, 18a-h, 18b-g, 18c-f, 18d-e, is arranged symmetrically around the center of the array. Each pair of antenna elements is connected by a transmission line, 19a-b, 21a-b, 23a-b, 25a-b, of approximately equal length. On presently preferred embodiment of the device includes a low frequency bilateral modulation mechanism 20, 22, 24, 26, which is interposed in the transmission lines, 19a-b, 21a-b, 23a-b, 25a-b, between paired antenna elements 18a-h.

It should be noted that bilateral modulation mechanism, 20, 22, 24, 26, allows tag received signal, 16, to be collected by the left-hand antenna element, 18a-d, modulated, and retransmitted out of the right-hand antenna elements, 18e-h, or vice versa. Signature generator, 27, generates the unique code that is imposed as information upon the tag received signal, 16. In conjunction with signature generator, 27, the bilateral modulation mechanism 20, 22, 24, 26, imposes a unique identification code upon outgoing tag transmitted signal, 17, and modulates the signal in either direction of propagation with frequency $f_R$ After modulation, tag transmitted signal, 17, with frequency ($f_0+f_R$), is retransmitted from array elements, 18e-h.

In addition, bilateral modulation mechanism, 20, 22, 24, 26, can absorb tag received signal, 16, when the information to be modulated onto the signal is in the "STOP" condition.

Figure 3:
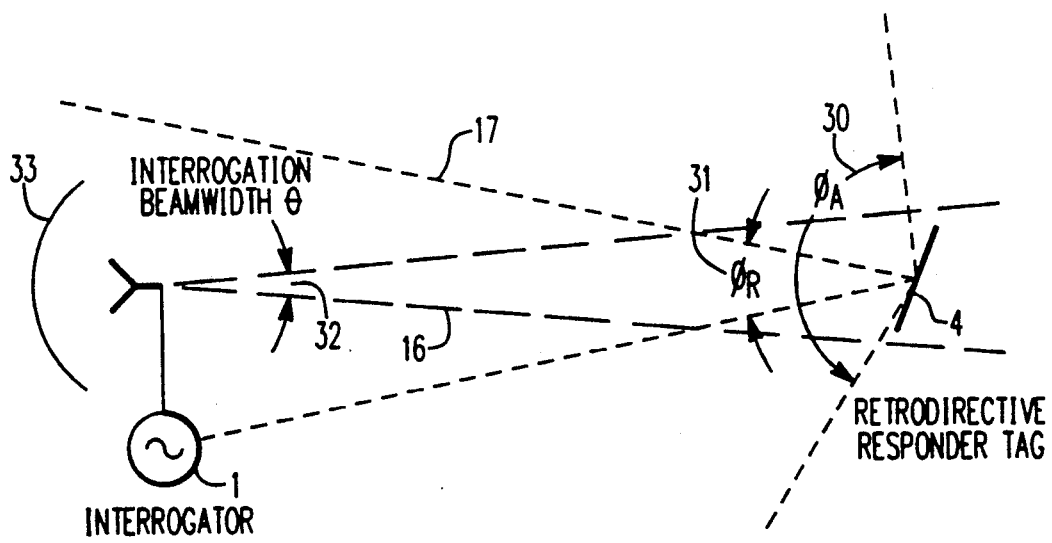
FIG. 3 is a diagrammatic representation of the respective beamwidths of an interrogator and a responder tag.

FIG. 3 illustrates an operational beamwidth diagram relevant to the system. Interrogator 1 illuminates responder 4 with an electromagnetic beam of interrogation beamwidth $\Theta$, 32. Tag acceptance beamwidth $\Phi_A$, 30, represents the wide solid angle (such as three (3) steradians) over which the responder device can accept interrogation signals. Tag acceptance beamwidth, 30, can approach a hemisphere and responder 4 can respond anywhere within that solid angle. However, the response of the responder 4 is concentrated within a smaller solid angle, namely tag response beamwidth $\Phi_R$, 31. Tag acceptance beamwidth, 30, is much greater than tag response beamwidth, 31. Responder 4 concentrates and directs tag transmitted signal, 17, back in the direction of tag received signal, 16, and interrogator receiving antenna reflector, 33.

Figure 4:
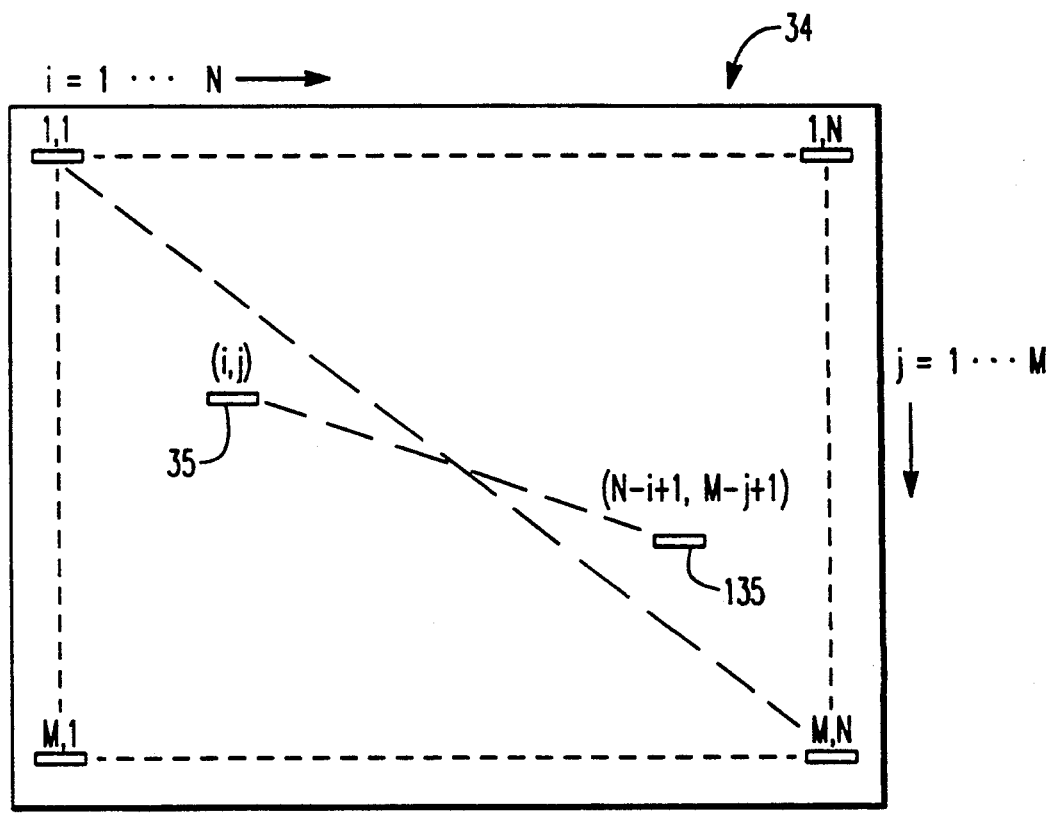
FIG. 4 is a diagrammatic representation of a Van Atta retrodirective array within a responder tag.

FIG. 4 represents a Van Atta retrodirective array antenna, 34. Array 34 consists of M rows and N columns of antenna radiating elements. Diagonal symmetry should be maintained, that is, the (i, j) element should be connected to the (N−i+1, M−j+1) element. For example in FIG. 4, element 35 should be connected to element 135. Each pair of array elements, such as element 35 and element 135, is connected by a transmission line of approximately equal length in which a modulating device is interposed, similar to the arrangement connecting paired antenna elements such as 18a-h, as shown in FIG. 2b.

Figure 5:
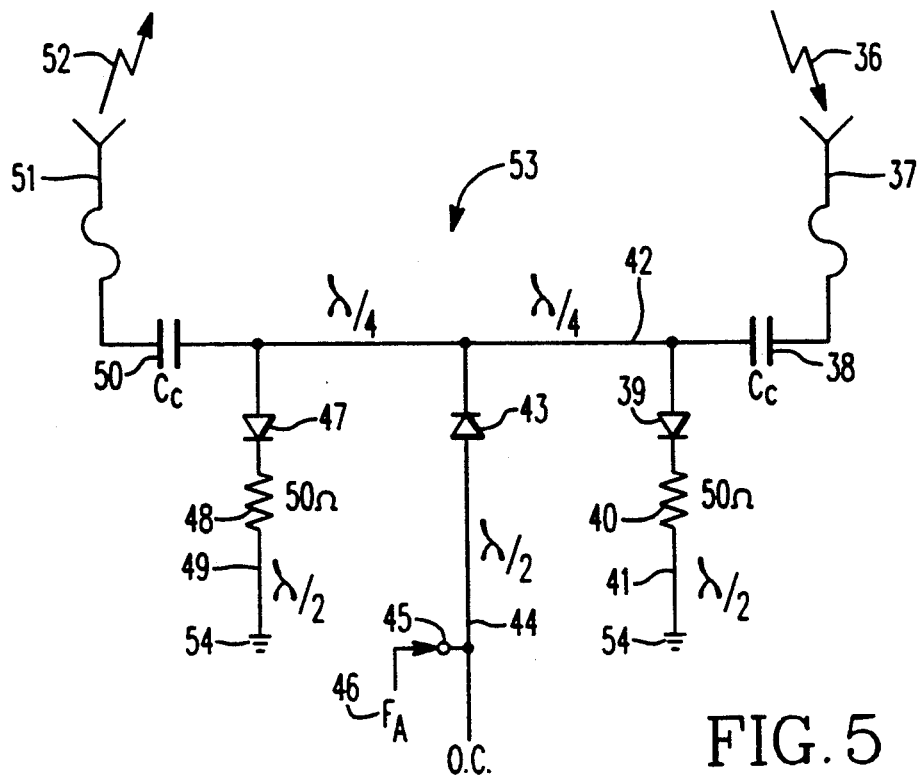
FIG. 5 is a circuit diagram of an embodiment using amplitude modulation of the signal collected by the Van Atta array.

FIG. 5 illustrates one implementation of the responder device absorptive modulation switch, 53. Although FIG. 5 shows a switch intended to impose information upon the interrogation signal using amplitude modulation, other modulation methods, such as frequency or phase modulation may be used to encode an interrogation signal before it is retransmitted back in the interrogator signal's direction of arrival. In addition, FIG. 5 shows a right-to-left direction of propagation of an interrogation signal. In a presently preferred embodiment, switch 53 is capable of propagating an interrogation signal in either the right-to-left direction or the left-to-right direction.

In FIG. 5, unmodulated received signal, 36, is collected by tag receiving element, 37, which is similar to array elements 18a-h in FIG. 2b. Signal 36 is propagated to element interconnection transmission line, 42, through right coupling capacitor ($C_c$), 38. The effect of switch 53 on signal 36 depends on whether central branch diode 43 is in the forward-biased condition or the reverse-biased condition. The forward-biased condition is effected by placing a positive direct current voltage across central diode 43. The reverse-biased condition is effected by placing a negative direct current voltage across central diode 43. Each condition will be considered in turn. Because the bias voltage is direct current in nature, coupling capacitors, 38, 50, act to block bias current flow to the antenna radiating elements 37, 51.

With central diode 43 in the forward-biased condition, current flows through diode 43, and diverges towards right lateral transmission branch, 41, and left lateral transmission branch, 49. This direction of current flow places a forward bias on right lateral branch diode, 39, and left lateral branch diode, 47, causing the bias current to return to ground, 54, through the lateral transmission branches, 41, 49. Signal 36 is diverted to ground, 54, along with the bias current. Thus, signal 36 is absorbed instead of being retransmitted.

With central branch diode 43 in the reverse-biased condition, diode 43 presents a high capacitive impedance to signal 36. Similarly, lateral branch diodes 39, 47, present a high impedance to signal 36. Therefore, signal 36 bypasses lateral transmission branches 41, 49 and central transmission branch 44. Instead, signal 36 is accepted by tag receiving element 37, coupled through capacitor 38 to transmission line 42, propagated along transmission line 42 to capacitor 50, coupled through capacitor 50 to tag transmitting element, 51, and retransmitted as modulated transmitted signal, 52.

In FIG. 5, unmodulated signal 36 is modulated by switch 53 alternating between absorption and retransmission states thus creating modulated transmitted signal, 52. Alternately, signal 36 may be entirely absorbed or entirely retransmitted by modulator switch 53 in FIG. 5.

While a certain presently preferred embodiment of the invention has been illustrated, it is understood that the invention is not limited thereto but may be otherwise variously embodied and practiced within the scope of the following claims.

What is claimed is:

1. An interrogation responsive system for remote monitoring comprising:
   (a) an interrogator having a transmitting antenna means for transmitting an interrogation signal;
   (b) a responder made of semiconductor material having a receiving antenna means for collecting said interrogation signal;
   (c) said responder further comprising encoding means connected to said responder receiving antenna means for imposing information on said interrogation signal collected by said responder;
   (d) said responder further comprising retrodirective means connected to said encoding means for retransmitting said interrogation signal encoded with said information in the direction of said interrogator as a responder signal, and wherein said retrodirective means further comprises at least one receiving antenna means which are configured as a Van Atta array having at least one pair of antenna elements, and wherein said van Atta array is comprised of a plurality of paired antenna elements disposed in a two-dimensional configuration, said paired antenna elements of said Van Atta array being disposed in diagonal symmetry around the center of said array and said encoding means is comprised of means for imposing said code signal to said interrogation signal intermediate each of said elements of respective pairs of said paired antenna elements, and wherein said encoding means further comprises means for modulating said information on said interrogation signal intermediate said respective elements of said paired antenna elements and wherein said modulation means encodes said interrogator signal in either direction of propagation between said paired elements of said Van Atta array; and
   (e) said interrogator having a receiving antenna means for collecting said responder signal and means for decoding said information.

2. The system of claim 1 in which said responder is fabricated of monolithic semiconductor material.

3. The system of claim 1 in which said responder is fabricated of a combination of monolithic semiconductor integrated circuits and discrete components mounted upon dielectric substrates.

4. The system of claim 1 wherein said encoding means further comprises an amplifier to amplify said encoded signal prior to transmission to said interrogator.

5. The system of claim 1 wherein said means for decoding said information further comprises a signal receiving means for selectively recognizing said encoded retrodirective signal from said responder.

6. The system of claim 1 wherein said encoding means further comprises means for transmitting said interrogation signal between each said element of said paired antenna elements.

7. The system of claim 1 wherein said encoding means further comprises a signal absorbing means in which said means for transmitting an interrogation signal between each element of said paired antenna elements absorbs said interrogation signal when said code signal to be imposed upon said interrogation signal passing through said means for transmitting is in "STOP" condition.

8. The system of claim 1 wherein said encoding means further comprises means for imposing a unique identification code on said interrogation signal passing through said means for transmitting so that said interrogator may identify said responder.

9. The system of claim 1 wherein said means for modulating said information on said interrogation signal comprises amplitude modulation.

10. The system of claim 1 wherein said means for modulating said information on said interrogation signal comprises frequency modulation.

11. The system of claim 1 wherein said means for modulating said information on said interrogation signal comprises phase modulation.

12. The system of claim 7 wherein the said signal absorbing means further comprises:
   (a) a transmission line connecting each said pair of said antenna elements of said Van Atta array;
   (b) two capacitors connected to said transmission line and separated by a distance of one-half wavelength;
   (c) one central branch of three-quarter wavelength length connected to said transmission line;
   (d) one diode interposed between said transmission line and said central branch such that said diode is connected at the cathode-end of said diode to said transmission line and, at the anode end of said diode, to said central branch;
   (e) at least one input port connected to said central branch at a distance of one half-wavelength from said diode in said central branch;
   (f) two lateral transmission branches wherein each said lateral branch is interposed between one of said capacitors and said midpoint of said transmission line;
   (g) each said lateral branch further comprises a transmission line of one half-wavelength in length connected to ground on one end and connected to a resistor on the other end; said resistor connected to the cathode-end of a diode; said diode connected at anode-end of said diode to said transmission line.

13. A responder comprising:
   (a) at least one receiving antenna means for collecting an interrogation signal from a first direction wherein said at least one receiving antenna means is configured as a Van Atta Array having at least one pair of antenna elements;
   (a) encoding means connected to said at least one receiving antenna means for encoding information on said interrogation signal; and
   (a) at least one transmitting antenna means connected to said encoding means for retrodirectively retransmitting said interrogation signal encoded with said information in said first direction as a responder signal, wherein said at least one transmitting antenna means is configured as a Van Atta array having at least one pair of antenna elements and wherein said Van Atta array is comprised of a plurality of paired antenna elements disposed in a two-dimensional configuration, said paired antenna elements of said Van Atta array being disposed in diagonal symmetry around the center of said array and wherein said encoding means is comprised of means for imposing said code signal to said interrogation signal intermediate each of said elements of respective pairs of said paired antenna elements and wherein said encoding means further comprises means for modulating said interrogation signal intermediate said respective elements of said paired antenna elements and wherein said modulation of said interrogation signal is performed in either direction of propagation between said paired elements of said Van Atta array.

14. The responder of claim 13 wherein said responder is fabricated of monolithic semiconductor material.

15. The responder of claim 13 wherein said responder is fabricated of a combination of monolithic semiconductor integrated circuits and discrete components mounted upon dielectric substrates.

16. The responder of claim 13 wherein said encoding means also comprises an amplifier to amplify said encoded signal prior to transmission in said first direction.

17. The responder of claim 13 wherein said encoding means further comprises means for transmitting said interrogation signal between each said element of said paired antenna elements.

18. The responder of claim 13 wherein said encoding means further comprises a signal absorbing means which absorbs said interrogation signal when said code signal to be imposed upon said interrogation signal passing through said means for transmitting is in "STOP" condition.

19. The responder of claim 13 wherein said encoding means further comprises means for imposing a unique identification code on said interrogation signal passing through said means for transmitting so that said interrogator may identify said responder.

20. The responder of claim 13 wherein said means for modulating said information on said interrogation signal comprises amplitude modulation.

21. The responder of claim 13 wherein said means for modulating said information on said interrogation signal comprises frequency modulation.

22. The responder of claim 13 wherein said means for modulating said information on said interrogation signal comprises phase modulation.

23. The responder of claim 18 wherein said signal absorbing means further comprises:
    (a) a transmission line connecting each said pair of said antenna elements of said Van Atta array;
    (b) two capacitors connected to said transmission line and separated by a distance of one-half wavelength;
    (c) one central branch of three-quarter wavelength length connected at the midpoint of said transmission line;
    (d) one diode interposed between said transmission line and said central branch such that said diode is connected at the cathode-end of said diode to said transmission line at said midpoint and, at the anode end of said diode, to said central branch;
    (e) at least one input port connected to said central branch at a distance of one half-wavelength from said diode in said central branch;
    (f) two lateral transmission branches wherein each said lateral branch is interposed between one of said capacitors and said midpoint of said transmission line;
    (g) each said lateral branch further comprises a transmission line of one half-wavelength in length connected to ground on one end and connected to a resistor on the other end; said resistor connected to the cathode-end of a diode; said diode connected at the anode-end of said diode to said transmission line.

* * * * *